Nov. 4, 1969
J. C. SAUER
3,476,527
BORON HYDRIDE CARBONYL COMPOUNDS
AND PROCESS OF PRODUCING THEM
Filed June 28, 1962
NUCLEAR MAGNETIC RESONANCE SPECTRUM OF $B_{12}H_{10}(CO)_2$
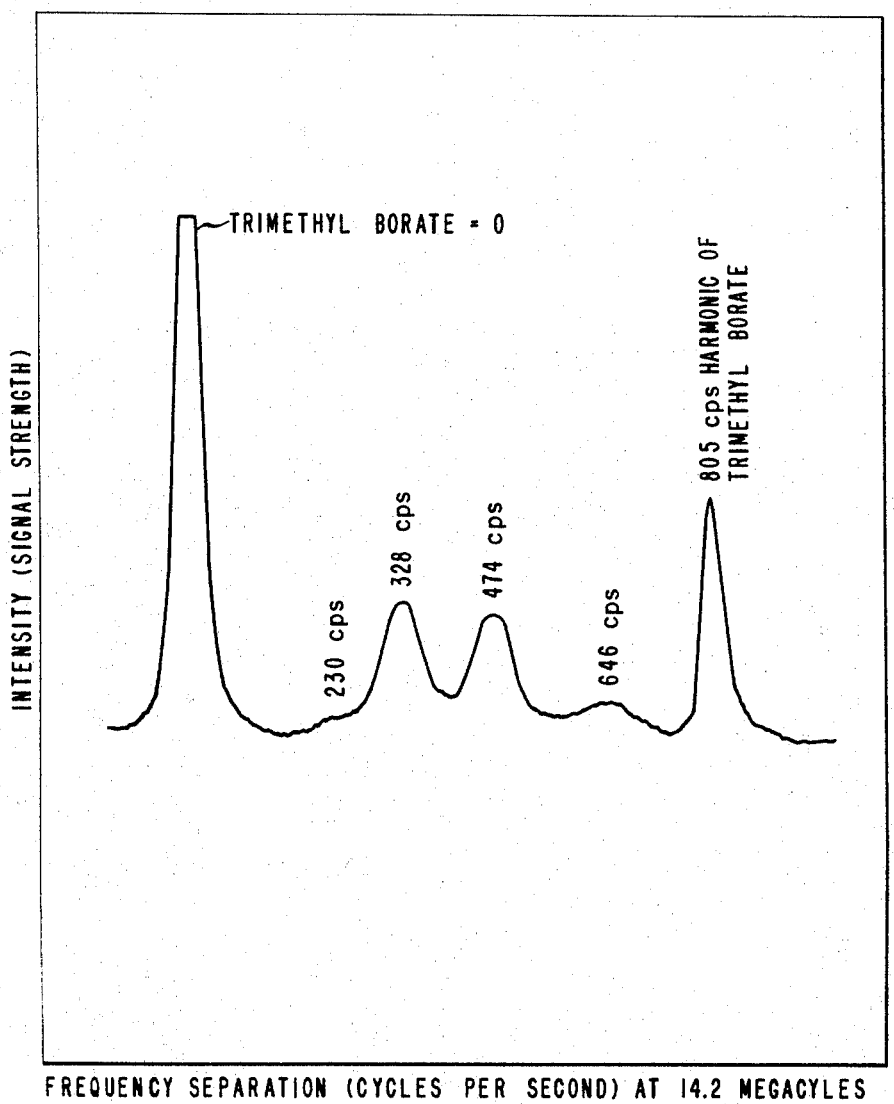
FREQUENCY SEPARATION (CYCLES PER SECOND) AT 14.2 MEGACYLES
*INVENTOR*
JOHN C. SAUER
BY
*ATTORNEY*

United States Patent Office 3,476,527
Patented Nov. 4, 1969

3,476,527
BORON HYDRIDE CARBONYL COMPOUNDS AND PROCESS OF PRODUCING THEM
John C. Sauer, Wilmington, Del., assignor to E. I. du Pont de Nemours and Company, Wilmington, Del., a corporation of Delaware
No Drawing. Filed June 28, 1962, Ser. No. 206,554
Int. Cl. C01b 6/08
U.S. Cl. 23—361                              3 Claims This invention relates to new boron hydride carbonyl compounds and to a process for making them.

Boron-hydrogen compounds have become technically important in recent years, especially as sources of high energy. Carbonyl compounds, including both metal carbonyls and organic carbonyl compounds, have long been valuable, the former as catalysts and volatile sources of pure metals, the latter as solvents and intermediates. To date, the only reported carbonyl compounds of boron hydrides are $BH_3CO$ and $B_4H_8CO$, both of which are unstable under ordinary conditions.

It has now been found that dodecaborane carbonyls can be made by reacting carbon monoxide with dihydrogen dodecahydrododecaborate, $H_2B_{12}H_{12}$. The principal products of this reaction are stable, crystalline compounds that can be represented by the formula (1)     $(H_3O^+)_m[B_{12}H_{10+m}(CO)_n]^{m-} \cdot mpH_2O$ where $m$ is zero or 1, $n$ is 1 or 2, the sum of $m$ plus $n$ is 2, and $p$ is a cardinal number and is at least 2.

Since there is no generally agreed-on system of nomenclature for boron-hydrogen compounds of this type, the products of this invention can be named in any of a number of ways. For example, $B_{12}H_{10}(CO)_2$, the product of Formula 1 when $m=0$ and $n=2$, can be named in any number of ways, including dodecaborane (10) dicarbonyl, dodecaborane-10 dicarbonyl, di(carbonyl)dodecaborane (10), or dodecaboron decahydride dicarbonyl. In addition, any of a number of formulas can be written to represent this product, including $B_{12}H_{10}(CO)_2$ (above), $B_{12}H_{10} \cdot (CO)_2$, $(CO)_2 \cdot B_{12}H_{10}$, and $B_{12}H_{10} \cdot 2CO$. Hereinafter, this product will arbitrarily be represented by the formula $B_{12}H_{10}(CO)_2$.

Similarly, the compounds $(H_2O^+)[B_{12}H_{11}CO]^- \cdot pH_2O$, the products of Formula 1 when $m$ and $n$ both are 1, can be named, for example, hydrates of hydronium carbonylundecahydrododecaborate (1—), hydrates of hydrogen carbonylundecahydrododecaborate, or by other names. In addition, they can be formulated, for example, as

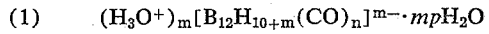

(above), $H_3O^+B_{12}H_{11}CO^- \cdot pH_2O$, or

Hereinafter, the formula $H_3O^+B_{12}H_{11}CO^-$, which has the virtue of relative simplicity but still bespeaks the ionic character of the compounds, will be used to designate the monocarbonyl and is to be understood to include the hydrates. In the formula $H_3O^+B_{12}H_{11}CO^- \cdot pH_2O$, where $p$ is a cardinal number, the value of $p$, which corresponds to the degree of hydration, varies with the conditions and extent of drying of the product. $p$ is seldom greater than 20 and rarely, if ever, less than 2. Usually it is from 2 to 15, inclusive.

The acid reactant $H_2B_{12}H_{12}$ is usually obtained, and can be used in the process of this invention, in the form of hydrates containing variable amounts of water. It can also be generated in the reactor used for the process of this invention, by acidifying one of its salts, e.g., the sodium salt, with a strong acid such as hydrochloric acid or anhydrous hydrogen chloride. The preparation of the carbonyl compounds of Formula 1 from a hydrate or an aqueous solution of $H_2B_{12}H_{12}$ constitutes a preferred embodiment of the process of the invention.

Any alkali-metal salt of $H_2B_{12}H_{12}$ can be prepared by the reaction of the appropriate alkali-metal hydroborate with diborane in the presence of an ether such as ethyl ether or 1,2-dimethoxyethane. The process is carried out in a closed system at a temperature of at least 100° C. and at autogenous pressure, which should be at least three atmospheres. The product can be recrystallized from ethers such as ethyl ether or tetrahydrofuran or mixtures thereof. Any organic solvate of crystallization can be removed by mixing the product with water and distilling out the organic solvate. The product is then isolated by evaporation. The sodium salt is thus obtained as monohydrate, $Na_2B_{12}H_{12} \cdot H_2O$, which can absorb water from the atmosphere to form the dihydrate $Na_2B_{12}H_{12} \cdot 2H_2O$. Salts of $H_2B_{12}H_{12}$ and their preparation are described in detail in assignee's copending application Ser. No. 30,442, filed May 20, 1960, in the name of H. C. Miller and E. L. Muetterties.

The free acid $H_2B_{12}H_{12}$ can be prepared by reaction of any of its soluble salts, in aqueous solution, with an acidic cation-exchange resin. The process leads to an aqueous solution of the free acid, which can be isolated as any of its several hydrates by controlled evaporation. The acid and its preparation are described in assignee's copending application Ser. No. 30,441, filed May 20, 1960, in the name of H. C. Miller and E. L. Muetterties. For convenience, the simple formula $H_2B_{12}H_{12}$ will be used to designate the acid in the discussion of the present invention and is to be considered as including the hydrates.

The $H_2B_{12}H_{12}$ obtained above is reacted with CO to obtain the products of the invention. Widely varying mole ratios of reactants can be used in the process. To insure complete consumption of the $H_2B_{12}H_{12}$, a $CO/H_2B_{12}H_{12}$ mole ratio of at least 1/1, as dictated by the stoichiometry of the reaction leading to formation of the monocarbonyl, is used. In practice, because of the carbon monoxide pressures that are conveniently employed, a large excess of carbon monoxide is used, e.g., mole ratios as high as several hundred to one. This presents no disadvantage, since carbon monoxide is cheap and readily available, and unused carbon monoxide can easily be separated and recycled.

The process can be carried out over a broad temperature range depending on the pressure used. At suitably high pressure, reaction can occur at as low a temperature as about 0° C. On the other hand, temperatures up to the decomposition point of the product can be used. For efficient operation, temperatures in the range 35–225° C. are used, temperatures of 60–180° C. being especially preferred.

Pressure is likewise not critical. The reaction can take place at atmospheric pressure, although for efficient operation it is desirable to use pressures of 200 atmospheres or higher. A preferred range is 500 to 1,000 atmospheres. Higher pressures, e.g., of several thousand atmospheres, can be used but confer no advantage.

A solvent is not required, but an inert solvent can be used if desired.

Known carbonylation catalysts such as dicobalt octacarbonyl can be used if desired, but the reaction proceeds in their absence.

Reaction begins immediately when the reactants are in contact at operable temperatures. Practical yields of the product are realized in 0.1–20 hours, especially 5–10 hours, and the latter is therefore the preferred time range.

The process is carried out in conventional equipment used for conducting chemical reactions under pressure. The inner surface of the reactor is inert to $H_2B_{12}H_{12}$ and mineral acids; suitable materials for this surface include silver and "Monel" (the trade name of a well-known commercial alloy of nickel and copper).

After completion of the reaction, any readily volatile material in the reaction mixture is removed by evaporation. When the starting $H_2B_{12}H_{12}$ has been formed by acidification of a salt of the acid, it may be advantageous, but it is not necessary, to further acidify the product mixture before evaporation. $B_{12}H_{10}(CO)_2$ can be isolated from the remaining material either by sublimation or extraction with a non-polar organic solvent followed by evaporation of the solvent or recrystallization. Benzene is a particularly suitable solvent both for extraction and recrystallization. $H_3O^+B_{12}H_{11}CO^-$ remains behind in any of the above isolation procedures since it is nonvolatile and insoluble in non-polar organic solvents.

$H_3O^+B_{12}H_{11}CO^-$ can be separated from the original product mixture by treating the mixture with a concentrated aqueous solution of tetramethylammonium chloride, whereupon a solid tetramethylammonium derivative of the monocarbonyl precipitates and can be separated by filtration. (The dicarbonyl is soluble and remains in solution in the filtrate at this point. It can be isolated by acidification as described below, followed by any of the isolation procedures of the preceding paragraph.) The monocarbonyl can be obtained from the tetramethylammonium derivative by passing a dilute aqueous solution of the latter through a column packed with a standard acidic cation-exchange resin and evaporating the acidic effluent liquid. Alternatively, the monocarbonyl can be isolated by treating the material left behind, after isolation of the dicarbonyl as described in the preceding paragraph, with tetramethyl ammonium chloride, acidifying, and evaporating.

$B_{12}H_{10}(CO)_2$ is a colorless, crystalline solid that sublimes at 80–100° C./1 mm. It is soluble both in polar solvents, e.g., water, and in non-polar solvents, e.g., benzene and methylene chloride. It has no maximum in the ultraviolet but shows strong end absorption below 2200 A. Its infrared absorption spectrum (methylene chloride solution) shows strong absorption at 2564 cm.$^{-1}$ (>B—H) and 2200 cm.$^{-1}$ (>B—CO), plus absorption at 2160 cm.$^{-1}$ (weak shoulder of the 2200-cm.$^{-1}$ band), 1262 cm.$^{-1}$ (weak), 1100 cm.$^{-1}$ (shoulder of the 1262-cm.$^{-1}$ band), 1085 cm.$^{-1}$ (weak), 1072 cm.$^{-1}$ (weak) 1062 cm.$^{-1}$ (shoulder of the 1072-cm.$^{-1}$ band), and 695 cm.$^{-1}$ (medium). The $B_{11}$ nuclear magnetic resonance spectrum of $B_{12}H_{10}(CO)_2$ is shown in the accompanying drawings.

The hydrates of $H_3O^+B_{12}H_{11}CO^-$ are nonvolatile, colorless, crystalline solids, soluble in water and insoluble in non-polar organic solvents. Their aqueous solutions are acidic.

$B_{12}H_{10}(CO)_2$ can exist in the form of three different position isomers, in which the two CO groups are located in three different ways relative to each other on the $B_{12}$ nucleus. At least two of these isomers have been separated by gas chromatography.

The following examples illustrate the product and process of this invention.

EXAMPLE I

A 400-cc., silver-lined shaker tube was charged with 20 g. of a hydrate of $H_2B_{12}H_{12}$ containing about seven moles of water per mole of $H_2B_{12}H_{12}$, sealed, and evacuated. With shaking, the tube was heated cautiously, and carbon monoxide was admitted under pressure in several stages, until a temperature of 80° C. and a pressure of 1000 atm. were reached. The tube was shaken for five hours at 80° C. and 975–1000 atm., with repressuring as necessary, and cooled to room temperature. Unreacted carbon monoxide was removed by venting the tube.

A portion of the semisolid product was dried under reduced pressure in a sublimation apparatus, and the dried material was heated at 100° C./1 mm. $B_{12}H_{10}(CO)_2$ was collected as a crystalline sublimate.

Analysis.—Calcd. for $C_2H_{10}B_{12}O_2$: C, 12.2; H, 5.1; B, 66.1. Found: C, 12.97; H, 5.47; B, 65.4.

The infrared absorption spectrum of the product (mineral-oil mull) showed strong bands at 3.9$\mu$ (>B—H) and 4.55$\mu$ (>B—CO); somewhat weaker bands at 9.3$\mu$ and 13.8$\mu$; and weaker bands at 9.1$\mu$ and 9.8$\mu$.

A second portion of the product from the shaker tube was dried at 25° C./1 mm. in the presence of $P_2O_5$ and extracted with hot benzene. When the benzene extract was cooled, $B_{12}H_{10}(CO)_2$ precipitated as a crystalline solid, which was separated by filtration and identified by its infrared absorption spectrum.

EXAMPLE II

A mixture of 10 g. of $Na_2B_{12}H_{12} \cdot 2H_2O$ and 5 g. of concentrated hydrochloric acid was charged to a 400-cc., silver-lined shaker tube and reacted with carbon monoxide, by the procedure of Example I, at 80° C. and 915–965 atmospheres for five hours. The crude product weighed 14 g. Two grams of this product was dissolved in 2 ml. of concentrated hydrochloric acid, and as much water as possible was removed from the solution in a desiccator at room temperature and 1 mm. pressure in the presence of $P_2O_5$. Sublimation of the residue gave $B_{12}H_{12}(CO)_2$, which was identified by its infrared absorption spectrum.

The remainder of the crude product was combined with 10 ml. of concentrated hydrochloric acid, and the mixture was evaporated on a steam bath. Sublimation of the residue gave $B_{12}H_{12}(CO)_2$, again identified by its infrared absorption spectrum. The total weight of $B_{12}H_{10}(CO)_2$ thus obtained was 1.9 g. (22%).

The unvolatilized material remaining after sublimation contained the monocarbonyl, $H_3O^+B_{12}H_{11}CO^-$. The infrared absorption spectrum of the material suggested that in addition there might be present at least one more additional boron hydride carbonyl, which might be an isomer of $B_{12}H_{10}(CO)_2$.

EXAMPLE III

The shaker tube of Example I was charged with 20 g. of the acid hydrate used in Example I and 2 g. of dicobalt octacarbonyl, and the mixture was reacted with carbon monoxide by the procedure of Example I at 90° C. and 910–925 atmospheres for four hours. The product was mixed with 22 g. of tetramethylammonium chloride as a concentrated solution in water. The solid that precipitated was separated by filtration and recrystallized from water. A dilute solution of part of this product in water was passed through a column packed with a commercial acid cation-exchange resin ("Amberlite" IR 120 H). The effluent solution was evaporated at 30–40° C./1–2 mm. and the solid thus obtained was dried over $P_2O_5$ at 100° C./0.2 mm. to give the monocarbonyl as a trihydrate, $H_3O^+B_{12}H_{11}CO^- \cdot 3H_2O$.

Analysis.—Calcd. for $CH_{20}B_{12}O_5$: C, 4.8; H, 8.2. Found: C, 4.7; H, 8.4.

The infrared absorption spectrum of the product (mineral-oil mull) showed strong bands at 4.1$\mu$ (>B—H) and 4.6$\mu$ (>B—CO), plus absorption at 2.8$\mu$, 3.4$\mu$, 6.4$\mu$, 9.1$\mu$, 9.2$\mu$, 9.3$\mu$, and 9.6$\mu$.

Higher hydrates of the monocarbonyl can be obtained by interrupting the concentration or drying steps sooner than in the foregoing examples. For example, if the drying procedure in Example III is not carried beyond the evaporation at 30–40° C./1–2 mm., the product is a solid hydrate containing about 15 moles of water. ($p$=about 15 in the formula $(H_3O^+)[B_{12}H_{11}CO]^- \cdot pH_2O$.)

The products of this invention are useful in the preparation of resistors from cellulosic materials, as is shown by the following example:

EXAMPLE A

A piece of cotton string 6 in. long was impregnated with a benzene solution of $B_{12}H_{10}(CO)_2$, and the benzene was evaporated. One end of the string was lit with a flame, whereupon the string burned to give a residual object that retained the original shape of the string and could be handled without disintegrating. When a portion of the product thus formed was placed on a solid paraffin wax support between two electrodes 21 mm. apart, it was found to have a resistance of 3000 ohms.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

1. A compound of the formula

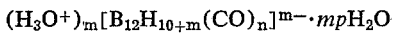

wherein $m$ is a whole number of from 0 to 1, inclusive; $n$ is a whole number of from 1 to 2, inclusive, the sum of said $m$ and $n$ being 2; and $p$ is a cardinal number of at least 2.

2. $B_{12}H_{10}(CO)_2$.

3. $(H_3O)^+[B_{12}H_{11}CO]^- \cdot pH_2O$ wherein $p$ is a cardinal number of at least 2.

References Cited

UNITED STATES PATENTS

| | | | |
|---|---|---|---|
| 2,113,353 | 4/1938 | McKennon | 23—14 |
| 2,113,354 | 4/1938 | McKennon | 23—14 |
| 2,783,124 | 2/1957 | Grote | 23—14 |
| 3,099,524 | 7/1963 | Grossmith | 23—14 |
| 3,166,378 | 1/1965 | Knott | 23—361 |
| 3,169,045 | 2/1965 | Miller et al. | 23—361 |

OTHER REFERENCES

Knoth et al.: Journal of the American Chemical Society, vol. 86, pp. 115–116 (Jan. 5, 1964).

Miller et al.: Journal of the American Chemical Society, vol. 85, pp. 3885–3886 (Dec. 5, 1963).

Adams: Boron, Metallo-Boron Compounds and Boranes, 1964, pp. 665–666.

Meldrum et al.: Introduction to Theoretical Chemistry, 1936, pp. 122–124.

MILTON WEISSMAN, Primary Examiner